July 3, 1934.  R. K. HOPKINS  1,965,079
ARC WELDING MACHINE
Filed Sept. 2, 1932
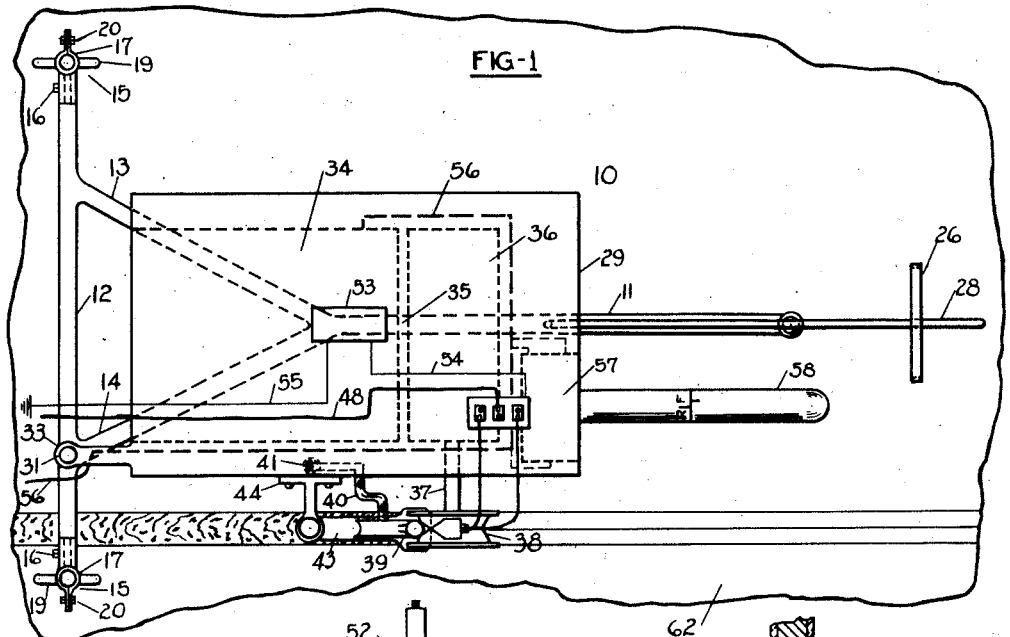
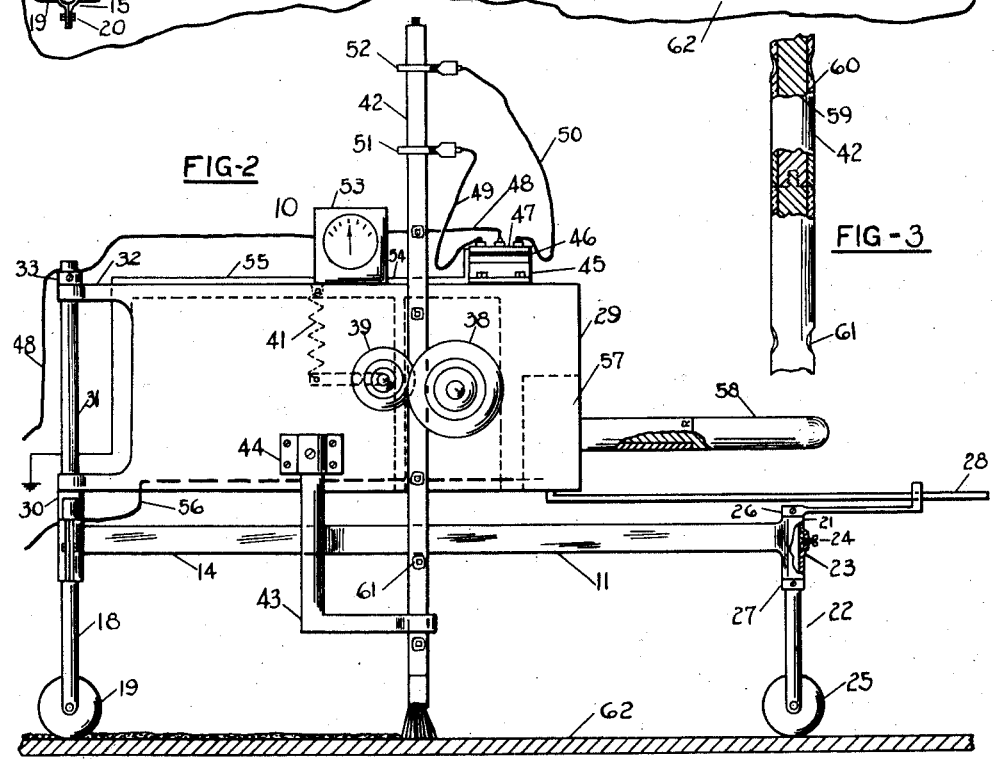
INVENTOR
Robert K. Hopkins
BY
Virgil F. Davies
ATTORNEY Patented July 3, 1934

1,965,079

UNITED STATES PATENT OFFICE 1,965,079

ARC-WELDING MACHINE

Robert K. Hopkins, New York, N. Y., assignor to The M. W. Kellogg Co., New York, N. Y., a corporation of Delaware Application September 2, 1932, Serial No. 631,467

13 Claims. (Cl. 219—8)

This invention relates in general to arc-welding and in particular to a light-weight machine of general utility which may be used to carry on arc-welding as a continuous operation with non-conducting material covered electrodes or with bare electrodes.

In fabricating articles by arc-welding from flat or curved plates the present practice is to use automatic or semi-automatic machines to deposit the metal which serves to hold the component parts of the articles together. The machines now available are large and of considerable weight hence the present practice is to fix the machines on appropriate supports and move the work relative to them. This is especially true of machines used in welding articles made from thick plates. It is seldom possible with these machines to do all of the welding required even on flat articles; when closed or partly closed articles, as for instance tanks, towers, etc., are fabricated, because of insufficient head room and other considerations the machines can only be used to weld the outside portions of the seams between component plates; the present practice is to weld the remaining portions of the seams mentioned by hand, with the result that the articles fabricated are not of uniform strength by reason of the inherently imperfect hand welds.

It is an object of this invention to provide a compact, light-weight, arc-welding machine of simple and rugged construction which can be used as an all purpose machine and which is especially adapted to carry on the welding operation in places and under conditions not suited to the present welding machines.

It is also an object of this invention to provide a machine of the character mentioned above having controls so arranged that the operator can move and guide the machine over the work, can regulate the feed of the electrode to the arc, can, if desired, oscillate the electrode over the weld, and do everything else that is necessary for proper welding and have the machine at all times under his full control.

It is a further object of this invention to provide a machine of the character mentioned which is adapted to use non-conducting material covered electrodes and with such electrodes carry on the welding as a continuous operation.

Other objects and advantages of the invention will be apparent from a consideration of a description of a preferred embodiment taken with the accompanying drawing, in which:—

Figure 1 is a plan view of the machine showing the arrangement of its component parts, Figure 2 is a front view of the machine, and Figure 3 is a part sectional view showing the construction of a sectional covered electrode.

Referring to the drawing:

The machine 10 includes a T shaped frame made up of members 11 and 12 integrally joined by members 13 and 14. Member 12 has its ends reduced to form short shafts which are journalled in members 15. Set screws 16 are provided that members 15 may be fixed in any desired position relative to the frame of machine 10. Each of members 15 includes a split bushing 17 disposed at right angles to the bushing in which is journalled the end of member 12. Into each of bushings 17 passes a shaft 18 which terminates in a yoke in which is supported wheel 19. Bushings 17 are provided with bolts and nuts 20 for fastening shafts 18. By this arrangement the rear legs of machine 10 may be adjusted as desired.

Integral with member 11 is a bushing 21 which serves as bearing for shaft 22 of the front leg of machine 10. Bushing 21 is recessed to accommodate a spring 23 which through screw 24 is made to bear on shaft 22 with the necessary pressure to prevent unwanted rotation of shaft 22. At the bottom of shaft 22 is a yoke which supports the steering wheel 25 of machine 10. At the top end of shaft 22 is fastened a member 26 which includes a collar and serves together with collar 27 to prevent axial movement of shaft 22 in bushing 21. If desired, the front leg of machine 10 may be constructed to be adjustable relative to member 11. Member 26 includes a slot whose ends are adapted to be engaged by lever 28, which is fastened to casing 29, to rotate shaft 22 and thus orient wheel 25 to steer machine 10.

Adjacent the joint of members 12 and 14 is a bushing 30 in which is fixed a shaft 31. Rotatably mounted on shaft 31 is a bracket 32 which forms part of, or may be attached to, casing 29. A collar 33 is fixed to shaft 31 above the top bearing of bracket 32 and serves to prevent vertical movement of bracket 32 relative to shaft 31.

Within casing 29 is mounted a reversible variable speed motor 34 whose shaft 35 is connected to the gear train of speed reducer 36. The output shaft 37 of speed reducer 36 extends through the wall of casing 29 and has keyed thereto electrode feed wheel 38. A friction wheel 39, journalled on shaft 40 which is bent to form a bell-crank, is urged by spring 41 to contact with electrode 42 to prevent slippage of wheel 38 relative to electrode 42. Shaft 40 is pivoted in the wall of casing 29 and has one end of spring 41 anchored to its end within casing 29. An electrode guide 43 is fixed to casing 29 by means of a bracket 44. The contacting surfaces of wheels 38 and 39 are made of fibre, or other similar material to prevent passage of the welding current to casing 29.

A stand 45 is fastened to the top of casing 29 and has fastened thereto an insulation plate 46 to which is in turn fastened a metal plate 47. The end of cable 48, connected to one side of a welding current source (not shown) is connected to plate 47. Cable 48 is arranged so as not to interfere with the movements of casing 29. Cables 49 and 50 which terminate in spring clips 51 and 52 are also fastened to plate 47. Spring clips 51 and 52 may be of any known construction but must be of such character as to be easily opened and clipped over electrode 42 to make good contact with the portions of electrode 42 hereinafter mentioned. Two clips 51 and 52 have been shown but if desired a greater number may be used. By using at least two clips sparking upon changing the position of the clips on electrode 42 is avoided and the arc is not interrupted during such change.

A voltmeter 53 is fastened to the top of casing 29 in a position to be easily seen by the operator of the machine. One of the terminals of voltmeter 53 is connected through conductor 54 to plate 47, the other terminal being connected through conductor 55 to a ground having the same potential as work 62. Conductor 55 is also arranged to prevent interference with the movements of casing 29.

The necessary current for motor 34 is led from a current source (not shown) through cable 56 which enters casing 29 and is also arranged to prevent interference with the movements of casing 29. Cable 56 includes the number of conductors required for the energization of motor 34. Cable 56 has an appropriate conductor or conductors connected to the combined start-and-stop switch, reversing switch and variable resistance 57 so that by rotating handle 58, which is connected to the rotatory element of combined switch and resistance 57, the functioning of motor 34 may be controlled as desired. In the present embodiment of the invention a combined switch and resistance having a rotary element is preferred, but this form of control is not essential as the machine will work just as well with a strip resistance or a carbon pile, or a motor governor of the usual construction.

Welding electrode 42 is made up of an indefinite number of like sections, that is to say, as one section is consumed another is added to the remaining section or sections and this procedure continued indefinitely. The sections may be of any convenient length, the maximum length for any job depending on the head room available. Each section comprises a metal core 59 about which is formed a covering 60 of ceramic or other non-conducting material. Each end of each section is provided with a part of a joint forming means. The joint forming means used must be such that the sections may be quickly and easily joined and must be strong enough to support the weight of electrode 42 below feed wheel 38, also it must give a sufficiently intimate metal to metal contact to allow passage of the welding current.

Each section of electrode 42 has its non-conducting covering scored at spaced intervals to expose small areas 61 of core 59 so that welding current may be passed from clips 51 and 52 to the arc.

To carry on the welding operation the work 62 is rigged and prepared in the usual manner and connected to one side of the current supply source. Machine 10 is then brought onto or into the work and its legs adjusted as required. A section of electrode 42 is then placed between wheels 38 and 39 and handle 58 rotated to start motor 34 in the direction to feed electrode 42 to work 62. Before the end of electrode 42 is made to approach work 62, clips 51 and 52 have been positioned to contact with adjacent areas 61 and cable 48 connected to the welding current source. When electrode 42 touches work 61 the operator may strike the arc by slightly raising machine 10 through handle 58 or may accomplish the same result by momentarily reversing motor 34.

After the arc is struck, the operator will bring it to the proper length by controlling the rate of feed of electrode 42 through handle 58. The operator's judgment may be checked by reference to voltmeter 53, thus assuring an arc of proper length even with a relatively inexperienced operator. When the proper length of arc is obtained, the operator will pull the machine along work 62 and will alter the rate of feed of electrode 42 as required to maintain the length of arc substantially constant. If the work is moved relative to machine 10, the operator will maintain machine 10 in position by resisting its movement through handle 58, or other means. If it is desired to oscillate electrode 42 across the weld the operator will accomplish the desired result by rotating casing 29 about shaft 31 through handle 58. As electrode 42 is consumed and the bottom one of clips 51 and 52 approaches wheels 38 and 39 the operator will remove said bottom clip and position it on electrode 42 to contact with exposed area above the one in contact with the other clip. This operation is repeated and sections added to electrode 42 as required to permit the welding operation to be carried on uninterruptedly.

The machine is steered automatically simply by maintaining electrode 42 on the line of the weld. For by so doing, lever 28 will push against one or the other of the ends of the slot of member 26 to change the orientation of wheel 25 as required. When welding a circular seam wheel 25 has a slight caster effect by reason of the point of contact between wheel 25 and work 62 being ahead of the center of wheel 25. However, if wheel 25 is not too large, the effect does not seriously interfere with the steering of machine 10. The caster effect may be eliminated entirely by making the support of wheel 25 angularly adjustable, as previously mentioned, and so adjusting it that the point of contact of wheel 25 and work 61 will be beneath bushing 21.

It is to be noted that operator need at no time remove his hand from handle 58 and therefore has full control of machine 10 at all times.

If desired, motor 34 may be controlled automatically to maintain the proper arc by connecting it in a known manner to means well known to the art (not shown) for this purpose. If this is done member 57 may be a combined starting stopping and reversing switch. Also when welding work which is moved relative to machine 10, machine 10 may be fixed on suitable supports (also not shown). Further, when machine 10 is moved relative to the work, it may be drawn along the work at the desired speed, by a car or other means driven by a suitable motor or other power source.

The machine has been shown and described in connection with a covered electrode but neither the machine nor the invention embodied therein is limited to this form of electrode for, if desired, an electrode having a conducting surface may be used. In such a case the welding current may be passed to the electrode through brushes or a nozzle as is the practice in the art.

While a preferred embodiment of the invention has been shown and described, it will be understood that the invention may be embodied in other forms and various changes made without departing from its principle, as defined in the appendant claims.

I claim:

1. In a portable electric-welding machine, a movable support, electrode feeding means thereon, and manually operable means for controlling said support and said electrode feeding means.

2. In a portable electric-welding machine, a movable carriage, a support mounted thereon, electrode feeding means carried by said support, and manually operable means for moving said carriage and controlling said electrode feeding means.

3. In a portable electric-welding machine, a movable carriage, a support mounted thereon, electrode feeding means carried by said support and means connected to said support for moving said carriage and controlling said electrode feeding means.

4. In a portable electric-welding machine, a movable carriage, electrode feeding means on said carriage mounted to oscillate relative thereto, and means for moving said carriage, oscillating said electrode feeding means, and controlling the feed of said electrode feeding means.

5. In a portable electric-welding machine, a movable carriage, a support movable with said carriage and mounted for oscillation relative thereto, electrode feeding means mounted on said support and means for moving said carriage, oscillating said support and controlling the feed of said electrode feeding means.

6. In a portable electric-welding machine, a movable carriage, a support movable with said carriage and mounted for oscillation relative thereto, electrode feeding means mounted on said support, and means connected to said support for moving said carriage, oscillating said support and controlling said electrode feeding means.

7. In a portable electric-welding machine, a steerable carriage, electrode feeding means carried thereby and manually operable means for steering said carriage, for moving said carriage and controlling said electrode feeding means.

8. In a portable electric-welding machine, a steerable carriage, a support movable with said carriage and mounted for oscillation relative thereto, electrode feeding means mounted on said support, means on said support for steering said carriage, and means for moving said carriage, oscillating said support and controlling said electrode feeding means.

9. In a portable electric-welding machine, a movable carriage having wheel supporting members adjustable relative thereto, one of said wheel supporting members being rotatable to steer said carriage, a support mounted on said carriage for oscillation relative thereto, means fixed to said support for rotating said one of said wheel supporting members upon oscillation of said support relative to said carriage, electrode feeding means on said support, and means fixed to said support for moving said carriage, oscillating said support relative to said carriage and controlling said electrode feeding means.

10. In a portable electric-welding machine, a movable carriage, electrode feeding means including a variable speed motor mounted thereon and manually operable means for moving said carriage and varying the speed of said motor.

11. In a portable electric-welding machine, a movable carriage, a support movable with said carriage and mounted for oscillation relative thereto, electrode feeding manually operable means including a variable speed motor mounted on said support, and means fixed to said support for moving said carriage, oscillating said support and varying the speed of said motor.

12. In a portable electric-welding machine, a steerable carriage, a support movable therewith and mounted for oscillation relative thereto, electrode feeding means including a variable speed motor mounted on said support, means for steering said carriage, and means carried by said support for moving said carriage, oscillating said support, varying the speed of said motor and actuating said steering means.

13. In a portable electric-welding machine, a carriage, a plurality of adjustable legs for said carriage, a pair of said plurality of legs being mounted at one end of said carriage and another of said legs being mounted at the opposite end of said carriage, said another leg being rotatable relative to said carriage for steering said carriage, means for rotating said another leg, means for preventing unwanted rotation of said another leg, a support mounted on said carriage for oscillation relative thereto, means extending from said support adapted to cooperate with said means for rotating said another leg, and means also extending from said support for moving said carriage and oscillating said support whereby when desired said first mentioned means extending from said support is made to cooperate with said means for rotating said another leg to steer said carriage.

ROBERT K. HOPKINS.